Patented Mar. 10, 1953

2,631,160

UNITED STATES PATENT OFFICE 2,631,160

OXIDATION OF UNSATURATED HYDRO-
CARBONS IN ACID SOLUTION

Carl B. Linn, Riverside, Ill., assignor to Universal Oil Products Company, Chicago, Ill., a corporation of Delaware No Drawing. Application March 29, 1949,
Serial No. 84,265

10 Claims. (Cl. 260—451)

1

This invention relates to a process for the oxidation of hydrocarbons containing polyolefinic unsaturation to form thereby valuable oxygenated derivatives of said hydrocarbons, the oxygen derivatives of certain classes of the hydrocarbon starting material being particularly valuable as drying oils in air-drying coating compositions. More specifically, the invention concerns a process for the oxidation of polyolefinic hydrocarbons in solution in a mineral acid, and relates particularly to a process involving the oxidation of polyolefinic, cyclic hydrocarbons, hereinafter referred to as unsaturated conjunct polymers, the oxygenated product of which is useful as a drying oil or as an intermediate therefor.

One object of the present invention is to provide a process for the oxidation of a mixture of polyolefinic, cyclic hydrocarbons recovered from a catalyst-hydrocarbon sludge formed in a conjunct polymerization reaction, producing thereby oxygen containing derivatives of said hydrocarbons having modified air-drying properties and possessing other characteristics which contribute to the utility of the hydrocarbons for many purposes, as hereinafter specified.

Another object of the invention is to provide a method for partially oxidizing a mixture of polyolefinic cyclic hydrocarbons or unsaturated conjunct polymers to thereby modify the physical properties of said hydrocarbons in such manner that the tendency of the unmodified conjunct polymers to form brittle, non-adhering films upon atmospheric drying is substantially eliminated.

Still another object of the process of the present invention is to effect the oxidation of unsaturated conjunct polymers consisting of polyolefinic, cyclic hydrocarbons of high molecular weight and containing a cyclopentenyl hydrocarbon structure and thereby obtain by virtue of said oxidation a product of corresponding structure having attached thereto oxygen-containing groups such as carbonyl and hydroxyl radicals.

A further object of the present process is to manufacture oxygen-containing organic compounds soluble in various organic solvents such as hydrocarbons and unsaturated fatty acid glyceride drying oils, said compounds containing unsaturated olefinic linkages in conjugated as well as non-conjugated relationship to each other which render the same subject to further oxidation and polymerization upon exposure thereof to atmospheric oxygen.

2

In one of its embodiments, the present invention concerns a process for oxidizing an olefinic hydrocarbon in the presence of a mineral acid soluble therewith which comprises contacting said olefinic hydrocarbon and acid with an oxygen-containing gas for a time and at such reaction conditions sufficient to convert said hydrocarbon to an organic oxygen-containing derivative thereof and thereafter removing said acid from the resulting product.

A more specific embodiment of the present invention comprises oxidizing a mixture of unsaturated conjunct polymers consisting of polyolefinic, cyclic hydrocarbon recovered from a sludge formed in a conjunct polymerization reaction and containing components which readily vaporize upon exposure of the same to atmospheric oxygen which comprises admixing said polyolefinic, cyclic hydrocarbons with from about 0.5 to about 5% by weight of anhydrous hydrogen fluoride in liquid phase and contacting said mixture with oxygen at a temperature not in excess of 100° C. and at a pressure of from about 1 to about 10 atmospheres and for a reaction period sufficient to react from about 0.5 to about 2 moles of oxygen per mole of conjunct polymer hydrocarbon and thereafter recovering from the resulting reaction mixture oxygen-containing derivatives of said conjunct polymers substantially no portion of which vaporize at normal atmospheric temperatures.

Other objects and embodiments of the present invention relating to specific charging stocks and to particular methods of effecting the present oxidation reaction will be hereinafter referred to in greater detail in the following further description of the invention.

It is generally recognized that certain unsaturated hydrocarbons of relatively high molecular weight and of specific structure when exposed in a thin film to atmospheric oxygen undergo what is generally considered to be a series of oxidation and polymerization reactions to form a hard, dry, resinous film having properties similar to protective coatings formed when an unsaturated fatty acid glyceride drying oil is exposed to atmospheric oxygen under like conditions. These hydrocarbons are consequently useful in the formulation of coating compositions such as paints and varnishes, to provide a protective surface for the article to which the drying oil is applied, and the resultant protective coating films have been found to posses individual characteristics, such as resistance to aqueous and alkali media, and present other distinguishing and practical differences over similar films obtained on exposure of fatty acid glyceride drying oils to atmospheric oxygen under like drying conditions. One of the preferred sources of hydrocarbon type drying oils are certain catalyst-hydrocarbon sludges formed by or during the conjunct polymerization of unsaturated hydrocarbons under controlled reaction conditions in which the sludge containing the unsaturated conjunct polymers forms as a distinct product of the conjunct polymerization reaction. The unsaturated conjunct polymers capable of undergoing drying reactions, also referred to herein as polyolefinic, cyclic hydrocarbons, are recovered from the sludge by special methods of decomposing the catalyst-hydrocarbon addition complexes contained in the sludge whereby the highly unsaturated structure of the recovered hydrocarbons is preserved. The unsaturated hydrocarbon conjunct polymers as recovered from the sludge vary in molecular weight from as low as about 250 to as high as about 450, the highest boiling fractions of which have molecular weights as high as about 1000. The components of the mixture of conjunct polymers thus recovered are characterized generally as polyolefinic, cyclic hydrocarbons in which the unsaturation is both of the conjugated as well as the non-conjugated variety, although essentially non-aromatic. This structure of the hydrocarbon components in the mixture of conjunct polymers is believed to be the basic factor involved in the ability of the hydrocarbons to undergo the so-called "drying" transformation on exposure of the hydrocarbons in a thin film to atmospheric oxygen. Although all components of the conjunct polymer hydrocarbon mixture contain a high degree of unsaturation and are capable of undergoing the drying transformation if the period of exposure of the hydrocarbons in the liquid state to atmospheric oxygen is of sufficient duration to permit the oxidation-polymerization reactions believed to be involved in the drying process, observations have shown that the low molecular weight components of the full boiling range mixture of conjunct polymers are sufficiently volatile that when the mixture is spread in a thin film at ordinary room temperatures, or even below, the low boiling components tend to evaporate and escape to the atmosphere before sufficient time has elapsed for the hydrocarbon to undergo the drying transformation and thereby become fixed in the form of a solid film to the surface to which they are applied. These low boiling point fractions, therefore, do not under ordinary circumstances or when unmodified to reduce their volatility contribute to the formation of a protective coating film because of their loss to the atmosphere by evaporation.

The process of the present invention may utilize as charging stock either the full boiling range mixture of conjunct polymers, or alternatively, the volatile, low molecular weight components thereof to reduce their volatility and enhance their capacity to form a protective film. It is especially desirable, when the present product is to be utilized as a drying oil, for example, in coating compositions, to separate the lowest boiling fraction from the full boiling range mixture of conjunct polymers (for example, a fraction boiling up to about 250° to about 300° C.), separately convert the same in accordance with the present process and thereafter admix the wholly or partially oxidized material with the remaining higher boiling fractions of the conjunct polymer mixture to provide a suitable drying oil for incorporation into the composition. In this manner, the lower boiling point fraction, which would usually (in the unconverted state) be lost to the atmosphere by evaporation thereof, when exposed in a thin film to atmospheric oxidation is converted into a relatively non-volatile derivative capable of further oxidation and polymerization on drying. The oxidized low boiling point fractions of the conjunct polymers also lends valuable film-forming properties to the unconverted portion of the conjunct polymers, although the latter higher boiling fractions in themselves will not, under normal atmospheric drying, form desirable films because of the tendency to form brittle, resinous films on drying.

It is also within the contemplation of the present process to utilize olefins or polyolefins, preferably of relatively long chain or of cyclic structure, desirably containing at least eight carbon atoms per molecule and further characterized as being soluble in the acid reagent herein provided as charging stock in the process. Thus, the charging stock may comprise a relatively straight or branched chain olefin or polyolefin such as dodecene and dodecadiene; a cyclic olefin or polyolefin such as allyl cyclohexene, butenylcyclohexadiene, etc. The latter oxidized products do not necessarily have oxidative drying properties, but may be utilized as alternative charging stocks in the process for the production of valuable oxygen-containing derivatives thereof, such as alcohols, aldehydes, ketones, etc. The charging stock may also contain a mixture of mono- and polyolefins and/or other hydrocarbons, such as a fraction separated from the products of a thermally cracked gas oil fraction. Such individual hydrocarbons or mixtures thereof may also be utilized and charged to the reaction in admixture with the conjunct polymer hydrocarbons hereinbefore specified. It is also within the contemplated process of the invention to utilize a solvent for the charging stock, preferably a paraffin hydrocarbon having a relatively low boiling point, such as liquefied butane, pentane, hexane, etc., which by its presence in the reaction mixture, modifies the rate of the reaction and/or solubilizes the end products of the process. The latter diluent may be removed from the ultimately obtained reaction mixture or may be allowed to remain therein as a naphtha solvent for the ultimate coating composition, when desired.

As heretofore indicated, one of the preferred charging stocks in the present process to which the oxidation reaction herein provided is especially applicable is a mixture of polyolefinic, cyclic hydrocarbons, herein referred to as unsaturated conjunct polymers, recovered from a sludge formed in a conjunct polymerization reaction. In the production of said conjunct polymers, certain types of hydrocarbons, generally characterized as unsaturated, and preferably non-aromatic, when contacted with particular inorganic catalysts of the acid-acting type at selected reaction conditions, undergo a conjunct polymerization reaction to form a sludge-like product containing loosely bound complex addition compounds of the catalyst and said conjunct hydrocarbon polymers as one product of the reaction. The latter mixture of hydrocarbons may be recovered, free of catalyst, from the sludge by special methods of decomposition.

A suitable sludge, the result of a conjunct polymerization reaction, is prepared by the reaction of unsaturated hydrocarbons containing at least three carbon atoms per molecule such as mono-olefins, polyolefins, and/or acetylenic hydrocarbons of either branched, straight or cyclic chain structure, either individually or in admixture with each other, with a conjunct polymerization catalyst generally characterized as an acid-acting compound. An especially preferred hydrocarbon charging stock from the standpoint of availability and desirability in producing a sludge in high yields is a hydrocarbon fraction containing olefinic components having about 6 to about 12 carbon atoms per molecule or an octene fraction of a selective or non-selective polymer gasoline (prepared by the co-polymerization of various butylenes and/or propylene). Other suitable hydrocarbon charging stocks to the conjunct polymerization reaction are the various fractions of thermally cracked gasoline which have been reduced in aromatic content, for example, by extraction, to provide a suitable charging stock. When mono-olefins are utilized as principal components of the charging stock, it is desirable to incorporate therein from about 5 to about 85 percent by weight of polyolefins, such as butadiene, pentadiene, cyclopentadiene, etc.

Suitable conjunct polymerization catalysts utilizable in the formation of the sludge include certain members of the anhydrous Friedel-Crafts metal halides such as anhydrous aluminum chloride and aluminum bromide, and certain inorganic acids. Acid acting catalysts of the above type effect conjunct polymerization of the unsaturated hydrocarbon charging stock at reaction conditions of from about −30° to about 200° C., preferably from about 0° to about 100° C., and at pressures sufficient to maintain the reaction mixture substantially in liquid phase. Of the inorganic mineral acids utilizable as conjunct polymerization catalysts, sulfuric acid having a concentration usually from about 85% and preferably from about 95 to about 100%, and hydrofluoric acid containing less than about 10% of water (preferably the substantially anhydrous reagent) comprise another group of the generally broad class of acid-acting inorganic compounds utilizable as catalysts in the conjunct polymerization of the unsaturated hydrocarbon charging stock.

Conjunct polymerization occurs in the mixture of catalyst and hydrocarbons and at the reaction conditions hereinabove specified by virtue of a series of reactions occurring substantially as a simultaneous reaction, referred to in the aggregate as a conjunct polymerization reaction. During the course of the reaction, in which the sludge is formed, polymerization, cyclization, isomerization and hydrogen transfer reactions occur between the individual hydrocarbons charged to the process forming thereby the sludge containing the unsaturated conjunct polymers and an upper hydrocarbon phase consisting of saturated conjunct polymers which are the recipients of the hydrogen transferred during the reaction between the hydrocarbons in the reaction mixture.

The sludge phase which separates from the upper layer saturated hydrocarbon phase upon allowing the completed reaction mixture to stand quiescent for a period sufficient to permit phase separation, may be separated from the upper layer saturated conjunct polymers, for example, by decantation and thereafter treated to decompose the catalyst-unsaturated conjunct polymer sludge complexes to recover therefrom the desired unsaturated hydrocarbons. The decomposition of the sludge may be effected by any suitable method, depending upon the catalyst utilized in the formation of the sludge, although certain procedures provide advantages in operation which are not common to the other conventional methods of sludge decomposition. One of such methods which may be employed to effect decomposition of any of the sludges regardless of the particular conjunct polymerization catalyst utilized in its formation, consists in hydrolyzing the sludge in an aqueous medium by thoroughly admixing the sludge with water or a dilute alkali solution. During the hydrolysis, the unsaturated conjunct hydrocarbon polymers associated with the catalyst in the sludge are released from this association and form a separate upper layer, while the water-soluble catalyst enters the lower aqueous phase. This method, although it results in the production of a high quality mixture of unsaturated conjunct polymers, destroys or dilutes the catalyst such that the latter cannot conveniently be recovered for recycling to the conjunct polymerization reaction.

The necessity of recovering the conjunct polymerization catalyst in a nearly anhydrous state by means of an economical procedure constitutes one of the chief advantages in the use of hydrogen fluoride as catalyst, since hydrogen fluoride may be vaporized from the sludge upon decomposition of the catalyst-unsaturated conjunct polymer hydrocarbon complexes, thereafter cooled and reliquefied for recycling purposes. This method, involving thermal decomposition of the sludge, is advantageously effected in the presence of a sludge decomposition catalyst such as metallic lead, copper, cobalt, and certain brasses containing copper, lead, and tin as well as graphitic carbon and certain metallic fluoride or oxyfluoride salts and yields a product in which the component hydrocarbons contain a maximum of conjugated and non-conjugated unsaturation.

Another alternative procedure utilizable to effect the thermal decomposition of the hydrogen fluoride sludge is accomplished by charging the sludge into a liquid pool of inert diluent maintained at a temperature sufficient to effect the decomposition of the hydrogen fluoride-unsaturated conjunct polymer complexes as well as the vaporization of the hydrogen fluoride from the decomposition zone. Suitable inert diluents for this purpose include such hydrocarbons as the octanes, nonanes, decanes, or mixtures thereof, boiling from about 90° to about 160° C. and maintained in the sludge decomposition reactor at the boiling point of the diluent, the necessary heat required for the endothermic decomposition of the hydrogen fluoride sludge being provided by reboiling the diluent hydrocarbons continuously and contacting the sludge with the hot vapors from the reboiling section of the sludge decomposition reactor. The desired unsaturated conjunct polymers are thereafter recovered from the mixture of diluent and sludge hydrocarbons by distillation.

The mixture of unsaturated conjunct polymers recovered from the sludge formed in the conjunct polymerization reaction and comprising one of the preferred charging stocks in the present process consists of polyolefinic, cyclic hydrocarbons containing conjugated and non-conjugated unsaturation, having relatively high molecular weights, of wide boiling range but of generally homologous structure, the cyclic portion of the hydrocarbons having a cyclopentenyl structure in which the olefin bond contained in the cyclopentene ring is in conjugation with one or more olefinic bonds present in the alkenyl or alkapolyenyl side chains attached to the cyclopentene ring. The individual hydrocarbons in the mixture are cyclic, although substantialy non-aromatic and have isolated unsaturation in addition to conjugated unsaturation. The hydrocarbons boil from about 150° to about 450° C., have bromine numbers above about 140, maleic anhydride values of from about 30 to about 90, and the number of olefinic double bonds per molecule in the structure of the unsaturated conjunct polymer hydrocarbons is from about 2.5 to about 4, of which from about 40 to about 70% are in conjugated relationship to each other.

In accordance with the process of the present invention, the oxidation of the unsaturated hydrocarbon, particularly a mixture of unsaturated conjunct polymers, is effected by contacting the hydrocarbon charging stock with an oxygen-containing gas such as air, a mixture of air enriched with oxygen, or if desired, with pure oxygen itself, the rate of reaction and the number of oxygen-carbon atom bonds introduced during the reaction increasing as the proportion of oxygen in the oxidizing gas increases. The mineral acid reagent introduced into the oxidation reaction mixture acts catalytically in increasing the rate and extent of the oxidation reaction. The mineral acid which is present in the reaction mixture, preferably in the anhydrous or highly concentrated state, is selected from the group comprising the relatively strong mineral acids including sulfuric, phosphoric, hydrochloric, hydrofluoric and hydrobromic acids or mixtures thereof, preferably anhydrous hydrogen fluoride. The amount of acid employed in the reaction mixture is generally from about 0.5 to about 5% by weight of the reaction mixture, the amount of acid introduced generally determining the rate and extent of oxidation which increase as the amount of acid increases. The acid may also be introduced into the reaction mixture in the form of a sludge therewith which is thoroughly and intimately mixed with the unsaturated hydrocarbon charge during the oxidation reaction. In general, the rate of oxidation and the nature of the products obtained therefrom are determined by the concentration of acid utilized in the reaction mixture. It has been observed, for example, that the number of hydroxyl groups introduced into the hydrocarbon molecule during the oxidation reaction increases as the amount of water increases. Other factors which influence the rate and extent of oxidation is the ambient pressure of the oxygen-containing gas, an increase in the pressure generally increasing the rate of oxidation and the total quantity of oxygen reacting with the unsaturated hydrocarbon charging stock. It has also been observed that the rate and extent of oxidation is markedly influenced by illumination of the reaction mixture with the ultra-violet radiation. The oxidation reaction may be interrupted at any stage of completion. In general, when a mixture of unsaturated conjunct polymers is utilized as charging stock, the oxidation ceases without illumination when the number of moles of oxygen reacted approaches from about 2.5 to about 3 moles of oxygen per mole of hydrocarbon charged but may be resumed by illuminating the reaction mixture with ultra-violet radiations. The reaction mixture is maintained at a temperature of from about $-30°$ to about $100°$ C. during the oxidation reaction, preferably at temperatures of from about $-10°$ to about $50°$ C., the reaction being unduly rapid at temperatures in excess of about $100°$ C. Furthermore, the products of the reaction at higher temperatures are generally undesired deep-seated oxidation products such as carbon dioxide, and carbon monoxide.

The mixture of mineral acid and unsaturated hydrocarbon charging stock may be oxidized in accordance with the present process by contacting the mixture in a suitable reactor such as a pressure autoclave or by merely bubbling the oxygen-containing gas through the mixture of unsaturated hydrocarbons and acid, maintained in liquid phase. The preferred procedure, however, for conducting the present oxidation process comprises dissolving the charging stock in a solvent which is essentially inert to the oxidizing gas, such as a paraffinic hydrocarbon or a halogenated paraffin analogue which remains in a liquid state at the temperature and pressure conditions provided in the oxidation reactor.

When a diluent is utilized, the mixture subjected to oxidation preferably contains from about one-half to about five volume proportions of the diluent to unsaturated hydrocarbon charging stock. The preferred diluent boils below the initial boiling point of the charging stock, enabling the diluent to be readily separated from the final oxidation product following the desired oxidation reaction. Of the above general group of diluents utilizable in the process, the normally liquid paraffinic and naphthenic hydrocarbons containing from about 4 to about 8 carbon atoms per molecule, such as normal butane, pentane, normal or cyclohexane, heptane, etc. comprise the preferred members. The presence of the inert diluent in the reaction mixture maintains homogeneity in the liquid phase and reduces the viscosity of the reaction mixture so that thorough agitation and admixing of the reactants may be effected. A further advantage of the inert diluent is the influence in controlling the reaction rate, especially in preventing the conversion or oxidation to proceed too rapidly or too far. The presence of the inert diluent results in the production of an oxidation mixture having a lighter color and containing few, if any, decomposition or cracked products in admixture with the desired oxygen-containing derivatives of the charging stock.

Examination of the oxidation reaction mixture indicates that a large proportion of the oxygen reacting with the unsaturated hydrocarbons appear as carbonyl groups in the oxidized product and some as hydroxyl and carboxylic acid groups. Ultra-violet absorption and infrared spectrum analyses of the product indicate that substantially all of the hydrocarbons originally charged undergo at least partial oxidation, although the original chain length or cyclic structure of the charging stock still remains intact.

The reaction product obtained following the desired degree of oxidation is desirably treated to remove the acid catalyst therefrom prior to separating the product into distinct compounds, for example, by distillation. A suitable treatment for the removal of the inorganic acid components where the products are of relatively high molecular weight and are water-insoluble comprises water-washing the product, thereby dissolving the water-soluble inorganic acid from the water-insoluble organic reaction products. Where, however, the product is likely to contain low molecular weight, water soluble oxidation products, such as alcohols, ketones, and aldehydes, the oxidation reaction mixture is desirably treated with a basic neutralizing agent which forms a solid or salt-like product by reaction with the mineral acid contained in the oxidation reaction mixture, which may be filtered to recover the resulting neutral oxidation product. In the latter instance, suitable basic or neutralizing agents include such compounds as solid sodium carbonate, calcium carbonate, gaseous ammonia, an amine, etc., which are thoroughly mixed with the oxidation reaction mixture. The recovered organic product may thereafter be distilled, preferably at subatmospheric pressures, to separate the latter into desired fractions containing relatively pure compounds. Where the charging stock is a mixture of unsaturated conjunct polymer hydrocarbons, the oxidation product, after removal of the acid catalyst may be utilized directly without further treatment, as, for example, in the formulation of a coating composition.

The oxidized unsaturated conjunct polymer product is useful as a binding agent for laminating and other purposes; as a component of printer's inks and dyes, as well as coating compositions, such as paints and varnishes, where the ability of the product to "dry" on exposure to atmospheric oxygen enables the material to enter into the composition of the ultimately dried film or protective coating obtained through oxidative drying. The oxidized material may also be incorporated with other drying oils, for example, an unsaturated fatty acid glyceride, such as linseed or tung oil, to modify the drying properties of the vegetable drying oil and particularly to reduce the tendency of such oils to form a brittle film on drying or one which tends to yellow on aging. The oxidized unsaturated conjunct polymers may also be incorporated with an unoxidized mixture of the hydrocarbons to provide a mixture of oils capable of "drying" with greater speed than in the absence of the oxidized hydrocarbons, and without forming a brittle film upon completion of the drying. The oxidized product may also be reduced with hydrogen, either partially or completely to the corresponding alcohol, the hydrogenated product forming a viscous oil which is valuable as a plasticizer in rubber, plastics, and allied compositions. The alcohols may also be converted into derivatives thereof such as the halides, esters, ethers, etc. to provide materials which are valuable per se.

The present invention is further illustrated with respect to certain specific embodiments in the following examples and although said examples specify particular reactions, conversion conditions, etc., they are not intended thereby to limit the generally broad scope of the invention, in strict accordance therewith.

*Example I*

A mixture of polyolefinic, cyclic hydrocarbons or unsaturated conjunct polymers was prepared by the reaction of a mixture of mono-olefinic hydrocarbons with liquefied hydrogen fluoride containing less than 1% water to form a hydrogen fluoride-hydrocarbon sludge phase and a relatively saturated upper layer hydrocarbon phase in accordance with the following procedure. 22 liters (16.5 kg.) of an olefinic non-selective copolymer having a bromine number of 116 and consisting of the copolymers of mixed butylenes and propylene containing from about 8 to about 12 carbon atoms per molecule was charged into a pressure autoclave and rapidly stirred as 9.0 kg. of liquid hydrogen fluoride was introduced into the reactor. The pressure was maintained throughout the reaction at an average value of about 205 lb./sq./in. by means of compressed nitrogen. The temperature was increased to 90° C. and stirring was continued for an additional hour. The reaction mixture separated into two phases on standing: an upper saturated hydrocarbon layer and a lower acidic sludge layer containing substantially all of the hydrogen fluoride charged into the reaction. The desired lower acidic sludge layer weighing 16.1 kg. consisted of a light, brown, mobile fluid.

5 kg. of the above hydrogen fluoride sludge was allowed to flow into a mixture of ice and water, additional ice being added as the heat reaction melted the ice in the resulting hydrolytic reaction. 2.17 kg. of a light colored, sweet-smelling oil separated from the aqeous phase, representing a yield of 42.2%, based on the weight of the original olefins charged. Examination of the unsaturated conjunct polymers recovered by the hydrolytic reaction indicates that the material has the following properties:

| | |
|---|---|
| Boiling range, °C. | 160 to about 400 |
| Density, $D_4^{20}$ | 0.863 |
| Refractive index, $n_D^{20}$ | 1.4871 |
| Color, Gardner | 12–13 |
| Molecular weight, average | 300 |
| Diene number | 85 |
| Bromine number | 195 |
| Double bonds per molecule, average | 3.2 |

Although the above mixture of conjunct polymers was prepared from a hydrogen fluoride sludge and was recovered therefrom by an aqueous hydrolysis procedure, a similar material may be obtained from an aluminum chloride or sulfuric acid sludge, and the conjunct hydrocarbon polymers may also be recovered from the hydrogen fluoride sludge by thermally decomposing the catalyst-hydrocarbon complexes contained in the sludge.

In order to illustrate the effect of added mineral acid to the unsaturated conjunct polymers during their oxidation, the following run was made to compare the results obtained upon oxidation of the polymers in the absence of a mineral acid catalyst with results of subsequent runs in which a mineral acid was present in the oxidation reaction mixture. 30 grams of the above unsaturated conjunct polymers was dissolved in 70 grams of normal pentane and charged into a rotating pressure autoclave into which oxygen was introduced to a pressure of 50 lbs./sq./in. The autoclave was rotated and maintained at a temperature of about 25° C. during the subsequent reaction. An induction period of at least 24 hours was required before any of the charged hydrocarbons began to absorb oxygen, as noted by the drop in pressure in the reactor. A total of 80 hours was required before one mole of oxygen per mole of unsaturated conjunct polymers had reacted and the oxygen absorption was reduced to a negligible rate at the end of this period. The product was a viscous-syrupy, clear colored liquid having a slightly greenish tint.

Example II

The mixture of unsaturated conjunct polymers recovered as in Example I above was oxidized in the presence of a trace of hydrogen fluoride in accordance with the following experiment. 25.2 grams of the unsaturated conjunct polymers was dissolved in 119 cc. of normal pentane and 0.3 gram of hydrogen fluoride added to the mixture. The resulting mixture was charged into a rotating pressure autoclave in the presence of approximately 50 lbs./sq./in. of oxygen and maintained at a temperature of 25° C. The latter mixture absorbed oxygen immediately, and after 57 hours of reaction, the liquid phase had gained 5.4 grams in weight. The resulting product analyzed 67.81% carbon, 9.84% hydrogen and 22.35% oxygen, the product having a dark-brown color with a pleasant ester-like odor.

Example III

The mixture of unsaturated conjunct polymers prepared as in Example I above was oxidized in the presence of a relatively large amount of hydrogen fluoride to determine the effect of acid concentration on the course of the reaction and the nature of the products obtained thereby. 25.2 grams of the unsaturated conjunct polymers was dissolved in a mixture of 119 cc. of normal pentane and 5.4 grams of anhydrous hydrogen fluoride. The resulting mixture was pressured with oxygen at 50 lbs./sq. in. in a rotating pressure autoclave maintained at a temperature of approximately 25° C. The resulting product was water washed to remove hydrogen fluoride, dried and analyzed for carbon hydrogen and oxygen; it contained 82.37% carbon, 11.01% hydrogen and 6.62% oxygen. The product was dark brown in color and very viscous.

The above results of the oxidation of polyolefinic, cyclic hydrocarbons in the presence and absence of hydrogen fluoride indicate that the presence of a mineral acid capable of dissolving in the unsaturated hydrocarbon charging stock during the course of the oxidation reaction eliminates the initial induction period noted in the absence of the mineral acid from the reaction mixture and greatly increases the extent of the oxidation reaction. The results of Example I indicate a maximum of about 1 mole of oxygen per mole of polyolefinic, cyclic hydrocarbons are capable of reacting to form a single mole of the oxidized hydrocarbons whereas the presence of greater quantities of hydrogen fluoride in the reaction mixture entirely eliminates the initial induction period and results in a product containing approximately 3 moles of oxygen for each 2 moles of unsaturated conjunct polymers reacted.

I claim as my invention:

1. A process for oxidizing an unsaturated hydrocarbon of at least 8 carbon atoms per molecule and containing olefinic unsaturation which comprises contacting said unsaturated hydrocarbon in the presence of substantially anhydrous hydrogen fluoride with a gas containing free oxygen for a time and at reaction conditions sufficient to convert said hydrocarbon to an organic oxygen-containing derivative thereof.

2. The process of claim 1 further characterized in that said oxidation is effected at a temperature of from about −30° to about 100° C.

3. The process of claim 1 further characterized in that said unsaturated hydrocarbon is a mixture of unsaturated conjunct polymers recovered from the sludge formed in a conjunct polymerization reaction.

4. The process of claim 1 further characterized in that said unsaturated hydrocarbon containing olefinic unsaturation is admixed with from about 0.5 to about 5 volume proportions of an inert paraffinic hydrocarbon containing fewer than about 8 carbon atoms per molecule prior to contacting the resulting mixture with said oxygen-containing gas.

5. A process for oxidizing an unsaturated hydrocarbon of at least 8 carbon atoms per molecule and containing olefinic unsaturation which comprises contacting said unsaturated hydrocarbon in the presence of substantially anhydrous hydrogen fluoride with a gas containing free oxygen for a time and at reaction conditions sufficient to convert said hydrocarbon to an organic oxygen-containing derivative thereof, introducing into the resulting reaction mixture a base capable of combining with said mineral acid, and thereafter separating the oxygen-containing derivative of said unsaturated hydrocarbon from the reaction mixture.

6. The process of claim 5 further characterized in that said base is solid sodium carbonate.

7. A process for oxidizing a mixture of unsaturated conjunct polymers recovered from a sludge formed in the conjunct polymerization reaction which comprises contacting said mixture of unsaturated conjunct polymers in the presence of substantially anhydrous hydrogen fluoride with a gas containing free oxygen at a temperature of from about −30° to about 100° C. for a time sufficient to convert said unsaturated conjunct polymers to organic oxygen-containing derivatives thereof and adding water to the resulting reaction mixture to cause the separation of an aqueous hydrogen fluoride phase from the organic oxygen-containing derivatives.

8. The process of claim 7 further characterized in that the amount of hydrogen fluoride in the reaction mixture is from about 0.5 to about 5% by weight of the unsaturated conjunct polymers.

9. A process for oxidizing a mixture of polyolefinic cyclic hydrocarbons, which comprises contacting said mixture and substantially anhydrous hydrogen fluoride in liquid phase with a gas containing free oxygen at a temperature of from about −30° to about 100° C. and for a time sufficient to form organic oxygen-containing derivatives of said hydrocarbons.

10. The process of claim 9 further characterized in that said hydrogen fluoride constitutes from about 0.5 to about 5% by weight of the reaction mixture.

CARL B. LINN.

REFERENCES CITED

The following references are of record in the file of this patent:

UNITED STATES PATENTS

| Number | Name | Date |
|---|---|---|
| 2,008,103 | Hyman | July 16, 1935 |
| 2,122,826 | Van Peski | July 5, 1938 |
| 2,369,182 | Rust et al. | Feb. 13, 1945 |
| 2,400,520 | Kuhn | May 21, 1946 |
| 2,440,477 | Johnstone | Apr. 27, 1948 |